United States Patent
McCaffrey

(10) Patent No.: US 10,077,670 B2
(45) Date of Patent: Sep. 18, 2018

(54) BLADE OUTER AIR SEAL MADE OF CERAMIC MATRIX COMPOSITE

(71) Applicant: UNITED TECHNOLOGIES CORPORATION, Hartford, CT (US)

(72) Inventor: Michael G. McCaffrey, Windsor, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 318 days.

(21) Appl. No.: 14/915,432

(22) PCT Filed: Aug. 29, 2014

(86) PCT No.: PCT/US2014/053424
§ 371 (c)(1),
(2) Date: Feb. 29, 2016

(87) PCT Pub. No.: WO2015/031764
PCT Pub. Date: Mar. 5, 2015

(65) Prior Publication Data
US 2016/0215645 A1 Jul. 28, 2016

Related U.S. Application Data

(60) Provisional application No. 61/871,445, filed on Aug. 29, 2013.

(51) Int. Cl.
*F01D 11/08* (2006.01)
*F01D 25/24* (2006.01)
*F01D 25/28* (2006.01)

(52) U.S. Cl.
CPC .............. *F01D 11/08* (2013.01); *F01D 25/24* (2013.01); *F01D 25/246* (2013.01); *F01D 25/28* (2013.01);
(Continued)

(58) Field of Classification Search
CPC .......... F01D 11/08; F01D 25/24; F01D 25/28; F01D 25/246; F05D 2300/6033; F05D 2240/11; Y02T 50/672
See application file for complete search history.

(56) References Cited

U.S. PATENT DOCUMENTS 3,966,353 A 6/1976 Booher, Jr. et al.
5,423,659 A 6/1995 Thompson
(Continued)

FOREIGN PATENT DOCUMENTS

| EP | 2093384 A2 | 8/2009 |
|---|---|---|
| WO | 9803594 A1 | 1/1998 |
| WO | 2014158286 A1 | 10/2014 |

OTHER PUBLICATIONS

The International Preliminary Report on Patentability for PCT Application No. PCT/US2014/053424, dated Mar. 10, 2016.
(Continued)

*Primary Examiner* — Christopher Verdier
*Assistant Examiner* — Maxime Adjagbe
(74) *Attorney, Agent, or Firm* — Carlson, Gaskey & Olds, P.C.

(57) ABSTRACT

One exemplary embodiment of this disclosure relates to a gas turbine engine including an engine case, a retention block attached to the engine case, and a blade outer air seal (BOAS). The BOAS includes a plurality of layers formed of a ceramic matrix composite (CMC) material. At least one of the plurality of layers provides a slot receiving a portion of the retention block.

14 Claims, 3 Drawing Sheets

(52) U.S. Cl.
CPC ...... *F05D 2220/32* (2013.01); *F05D 2230/30* (2013.01); *F05D 2240/11* (2013.01); *F05D 2260/30* (2013.01); *F05D 2300/6033* (2013.01); *Y02T 50/672* (2013.01)

(56) References Cited

U.S. PATENT DOCUMENTS

| | | |
|---|---|---|
| 5,486,090 A | 1/1996 | Thompson |
| 5,538,393 A | 7/1996 | Thompson et al. |
| 6,393,331 B1 | 5/2002 | Chetta et al. |
| 8,118,546 B2 * | 2/2012 | Morrison ................. F01D 9/04 415/173.1 |
| 8,206,087 B2 | 6/2012 | Campbell et al. |
| 8,303,247 B2 | 11/2012 | Schlichting et al. |
| 2007/0031258 A1 | 2/2007 | Campbell et al. |
| 2008/0211192 A1 | 9/2008 | Pietraszkiewicz et al. |
| 2009/0010755 A1 | 1/2009 | Keller et al. |
| 2009/0067994 A1 | 3/2009 | Pietraszkiewicz et al. |
| 2009/0169368 A1 | 7/2009 | Schlichting et al. |
| 2009/0208322 A1 | 8/2009 | McCaffrey |
| 2013/0108416 A1 | 5/2013 | Piggush et al. |
| 2013/0170963 A1 | 7/2013 | Mironets et al. |

OTHER PUBLICATIONS

Supplementary European Search Report for European Application No. 14839747.4 dated Jul. 28, 2016.

\* cited by examiner

BLADE OUTER AIR SEAL MADE OF CERAMIC MATRIX COMPOSITE

BACKGROUND

Gas turbine engines typically include a compressor section, a combustor section, and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other loads.

The compressor and turbine sections of a gas turbine engine include alternating rows of rotating blades and stationary vanes. The turbine blades rotate and extract energy from the hot combustion gases that are communicated through the gas turbine engine. The turbine vanes direct the hot combustion gases at a preferred angle of entry into a downstream row of blades. An engine case of an engine static structure may include one or more blade outer air seals (BOAS), which are typically formed of metal, that establish an outer radial flow path boundary for channeling the hot combustion gases.

SUMMARY

One exemplary embodiment of this disclosure relates to a gas turbine engine including an engine case, a retention block attached to the engine case, and a blade outer air seal (BOAS). The BOAS includes a plurality of layers formed of a ceramic matrix composite (CMC) material. At least one of the plurality of layers provides a slot receiving a portion of the retention block.

In a further embodiment of any of the above, the BOAS includes a base structure and an overwrap layer provided over the base structure, and wherein both the base structure and the overwrap layer are provided by a CMC material.

In a further embodiment of any of the above, the base structure includes first and second ends at opposite circumferential sides of the BOAS, and a bridge extending between the first and second ends.

In a further embodiment of any of the above, the first and second ends are curved in substantially a C-shape to provide first and second slots.

In a further embodiment of any of the above, each of the first and second slots receive a portion of a retention block attached to the engine case to support the BOAS relative to the engine case.

In a further embodiment of any of the above, both the first ends and the second ends are provided by a CMC material having primary fibers arranged to substantially follow a contour of a respective one of the slots.

In a further embodiment of any of the above, the bridge is provided by a CMC material having primary fibers extending circumferentially, relative to an engine central longitudinal axis, between the first end and the second end.

In a further embodiment of any of the above, the overwrap layer includes a central body portion having a plurality of projections extending therefrom, the plurality of projections contacting the base structure.

In a further embodiment of any of the above, the central body portion provides a radially inner surface of the BOAS.

In a further embodiment of any of the above, the overwrap layer includes a fore flap and an aft flap extending from the central body portion, the fore flap and the aft flap providing fore and aft surfaces, respectively, of the BOAS.

Another exemplary embodiment of this disclosure relates to a blade outer air seal (BOAS). The BOAS includes a base structure, an overwrap layer provided over the base structure. Both the base structure and the overwrap layer are provided by a ceramic matrix composite (CMC) material.

In a further embodiment of any of the above, the base structure includes first and second ends at opposite circumferential sides of the BOAS, and a bridge extending between the first and second ends.

In a further embodiment of any of the above, the first and second ends are curved in substantially a C-shape to provide first and second slots facing circumferentially away from a center of the BOAS.

In a further embodiment of any of the above, both the first ends and the second ends are provided by a CMC material having primary fibers arranged to substantially follow a contour of a respective one of the first and second slots.

In a further embodiment of any of the above, the bridge is provided by a CMC material having primary fibers extending circumferentially between the first end and the second end.

An exemplary method according to this disclosure relates to a method for forming a blade outer air seal (BOAS). The method includes forming a base structure of a ceramic matrix composite (CMC) material, and wrapping an overwrap layer of CMC material over the base structure.

In a further embodiment of any of the above, the step of forming the base structure includes: forming a first end of a CMC material, forming a second end of a CMC material, the second end formed separate from the first end, and forming a bridge of a CMC material.

In a further embodiment of any of the above, the bridge is formed separately from the first end and the second end.

In a further embodiment of any of the above, the step of forming the base structure includes molding the first end, the second end, and the bridge into a semi-rigid state.

In a further embodiment of any of the above, the step of forming the overwrap layer over the base structure includes molding the first end, the second end, the bridge and the overwrap layer into a solid state.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

The drawings can be briefly described as follows.

DETAILED DESCRIPTION

Figure 1:
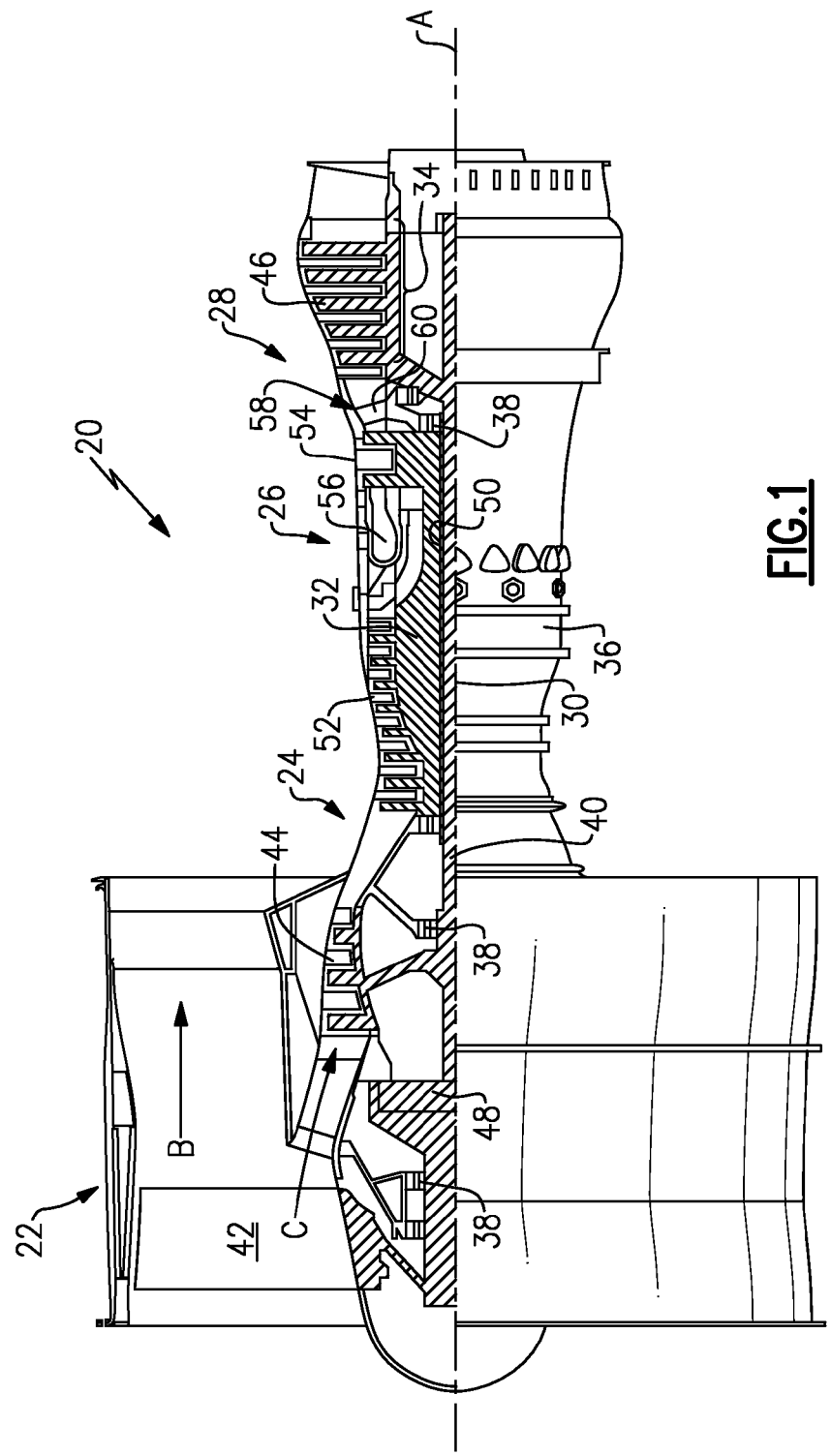
FIG. 1 illustrates a schematic, cross-sectional view of a gas turbine engine.

FIG. 1 schematically illustrates an example gas turbine engine 20 that includes a fan section 22, a compressor section 24, a combustor section 26, and a turbine section 28. Alternative engines might include an augmenter section (not shown) among other systems or features. The fan section 22 drives air along a bypass flow path B while the compressor section 24 draws a core airflow C in along a core flow path where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section. The concepts disclosed herein can further be applied outside of gas turbine engines.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about five (5). The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/(518.7°\ R)]^{0.5}$. The "Low corrected fan tip speed," as disclosed herein according to one non-limiting embodiment, is less than about 1150 ft/second.

Figure 2:
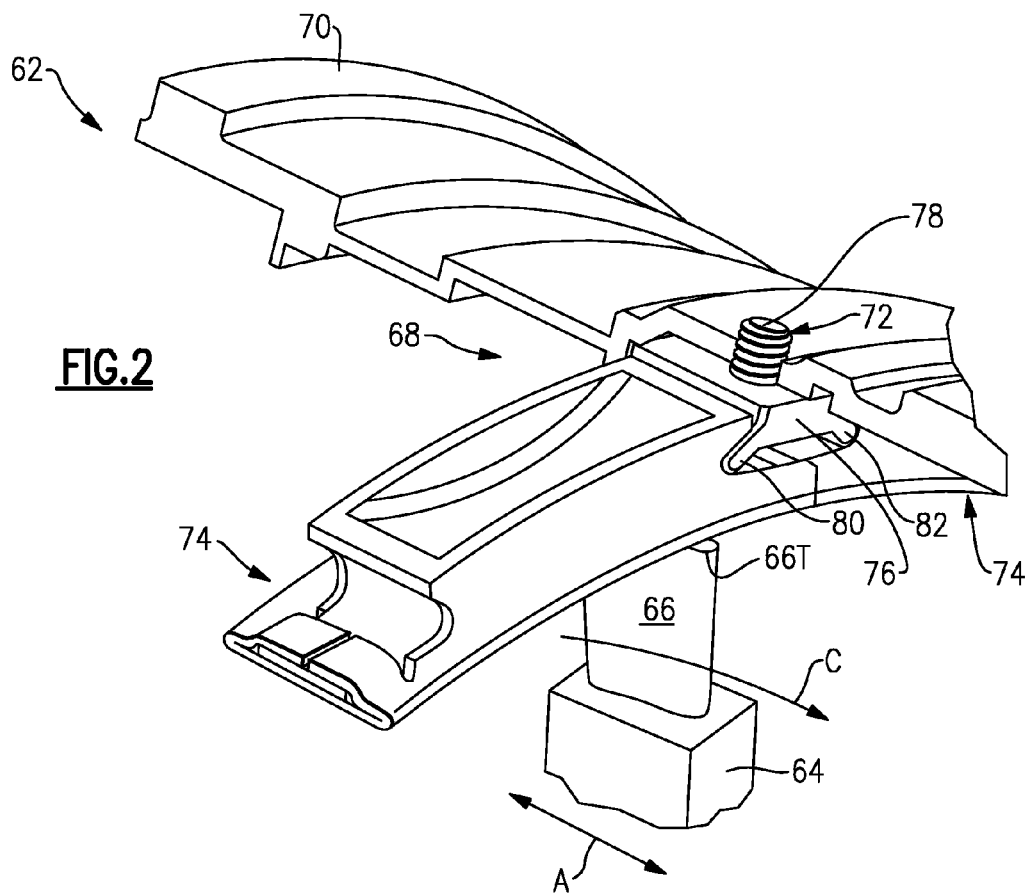
FIG. 2 illustrates a portion of the example engine of FIG. 1.

FIG. 2 is a perspective view of a portion 62 of the gas turbine engine 20 of FIG. 1. In this embodiment, the portion 62 is a portion of the high pressure turbine 54. It should be understood, however, that other portions of the gas turbine engine 20 may benefit from the teachings of this disclosure, including but not limited to the fan section 22, the compressor section 24, and the low pressure turbine 46.

In this embodiment, a rotor disc 64 (only one shown, although multiple discs could be axially disposed within the portion 62) is configured to rotate about the engine central longitudinal axis A. The portion 62 includes an array of rotating blades 66 (only one shown), which are mounted to the rotor disc 64, and arrays of static vane assemblies (not shown) on axial sides of the blades 66.

Each blade 66 includes a blade tip 66T at a radially outermost portion thereof. The rotor disc 64 is arranged such that the blade tips 66T are located adjacent a blade outer air seal (BOAS) assembly 68. The BOAS assembly 68 may find beneficial use in many industries including aerospace, industrial, electricity generation, naval propulsion, pumps for gas in oil transmission, aircraft propulsion, vehicle engines and stationary power plants.

The BOAS assembly 68 is disposed in an annulus radially between an engine case (such as an outer casing 70 of the engine 20) and the blade tips 66T. The BOAS assembly 68 includes a support structure 72 and a plurality of BOAS segments 74. The BOAS segments 74 may be arranged to form a full ring hoop assembly that circumferentially surrounds the associated blades 66, which provides a sealing surface for the blade tips 66T to prevent leakage of the core airflow C over to the blades 66. For ease of reference, the individual BOAS segments 74 may be referred to individually as a "BOAS segment" or simply a "BOAS."

In this example, the support structure 72 includes a retention block 76 fastened to the engine outer casing 70 by a fastener 78. The retention block 76 includes tapered arms 80, 82 on circumferentially opposed sides thereof. The tapered arms 80, 82 in this example are rounded, and are to be received within a corresponding curved end of a respective BOAS segment 74 (as will be explained below).

Figure 3:
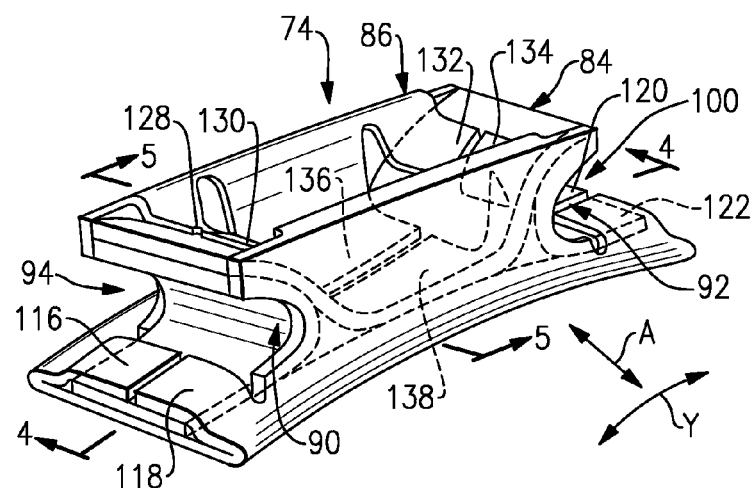
FIG. 3 illustrates a perspective view of an example BOAS according to this disclosure.

FIG. 3 illustrates the detail of an example BOAS segment 74 according to this disclosure. In this example, the BOAS segment 74 is primarily made of a ceramic matrix composite (CMC) material. The BOAS segment 74 may include some non-CMC materials, such as for the fillers 110, 112, discussed below. As is known in this art, CMC materials include a ceramic matrix and a plurality of fibers suspended in that ceramic matrix. The fibers can be a ceramic fibers, silicon carbide fibers, carbon fibers, or metallic fibers, as examples.

The exemplary BOAS segment 74 includes a base structure 84 and an overwrap layer 86. The detail of the base structure 84 is perhaps best seen with reference to FIG. 4, which is a cross-sectional view taken along lines 4-4 in FIG. 3. For ease of reference, FIG. 4 does not include the overwrap layer 86.

Figure 4:
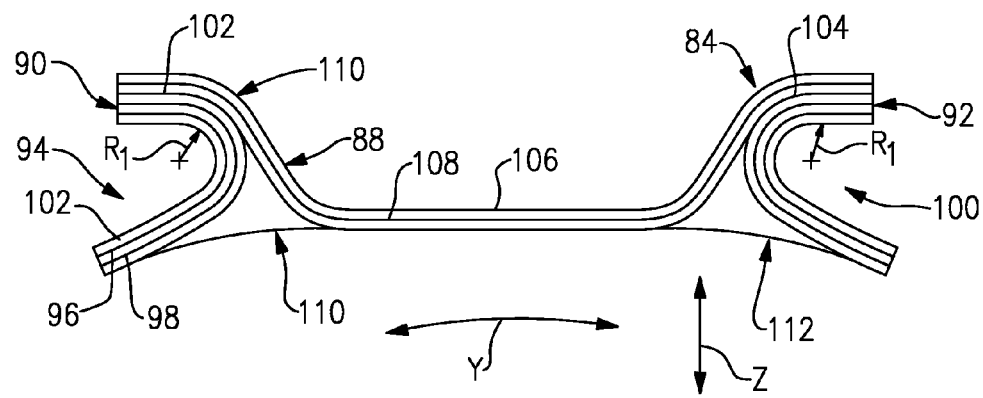
FIG. 4 is a view taken along line 4-4 from FIG. 3, and illustrates a base structure of the BOAS of FIG. 3.

With reference to FIG. 4, the base structure 84 includes a bridge 88 and a pair of opposed first and second ends 90, 92 on circumferentially opposite sides of the base structure 84. The circumferential direction Y is normal to the engine central longitudinal axis A.

The first end 90 is generally C-shaped and substantially tracks a radius $R_1$, which has an origin in a slot 94 defined by the curvature of the first end 90. In this example, the first end 90 is made of CMC, and therefore includes a plurality of fibers suspended within a ceramic matrix. In this example, the fibers are represented at 96, 98, and extend in a curved direction following the radius $R_1$. This fiber orientation provides the first end 90 with increased strength in the direction of the fibers, and further prevents delamination between CMC sheets (where sheets are used to form the end 90). While not discussed herein for the sake of brevity, it should be understood that the second end 92 is arranged similarly to the first end 90 to provide another slot 100.

In order to support the BOAS segment 74 relative to the outer casing 70 of the engine 20, the slots 94, 100 receive an arm (e.g., 80 or 82) from a retention block 76. In this example, the arms 80, 82 are rounded to substantially follow the contour of the slots 94, 100. The BOAS segments 74 may further be urged radially inwardly against the retention block 76 by a pressurized flow of fluid.

In one example, the first and second ends 90, 92 are provided by a plurality of layered CMC sheets. In this example, any number of sheets may be used, and the sheets may include primary fibers extending along a length thereof. The sheets may further be arranged such that the primary fibers extend as illustrated at 96, 98. In another example, the first and second ends 90, 92 are provided using a polymer infiltration and pyrolosis process (PIP), a chemical vapor infiltration (CVI) or a chemical vapor deposition (CVD) process, wherein the fibers (e.g., those illustrated at 96, 98) are provided in a preform, and a ceramic infiltrates that preform to form the first and second ends 90, 92.

The first and second ends 90, 92 are connected together by a bridge 88 spanning circumferentially therebetween. In this example, the bridge 88 contacts a radially outer surface 102 of the first end 90 and further contacts a radially outer surface 104 of the second end 92. The bridge includes a substantially planar portion 106 extending circumferentially between the first and second ends 90, 92. The bridge 88 essentially urges the first and second ends 90, 92 radially inwardly (e.g., down, relative to FIG. 4) against the overwrap layer 86, as will be explained below.

The bridge 88, like the first and second ends 90, 92, is formed of a CMC material (e.g., by polymerized preceramic resin layered ceramic-fiber sheets, PIP, CVI, or CVD). The bridge 88 includes a plurality of fibers, represented at 108, extending in the circumferential direction Y between the first and second ends 90, 92.

In the illustrated examples, there are gaps between the first and second ends 90, 92 and the bridge 88. These gaps are be filled with fillers 110, 112. In one example, the fillers 110, 112 are made of a mix of ceramic fibers and a ceramic-precursor resin material. In other examples, the fillers 110, 112 are made of a monolithic ceramic or a fully processed CMC material. The fillers 110, 112 increase the rigidity of the base structure 84.

With reference back to FIG. 3, the base structure 84 is held together in one example by an overwrap layer 86. In this example, the overwrap layer 86 is provided by either a single CMC sheet, or a plurality of layered CMC sheets defining a single overwrap layer 86. In another example, the overwrap layer 86 may be provided using the PIP, CVI or CVD processes discussed above.

Figure 6:
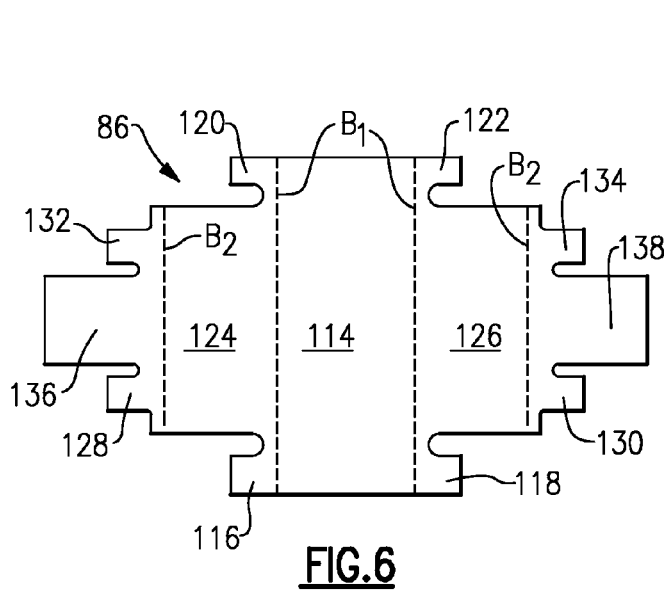
FIG. 6 illustrates an overwrap layer of the BOAS of FIG. 3.

With continued reference to FIG. 3, and with additional reference to FIG. 6 (which illustrates the overwrap layer 86 in a laid-out state), the overwrap layer 86 includes a central body portion 114 having a plurality of flaps and projections extending therefrom. When formed, the central body portion 114 becomes a radially innermost surface of the BOAS segment.

For example, the central body portion 114 includes a first pair of projections 116, 118 which contact an inner surface of the slot 94 in the first end 90. The overwrap layer similarly includes a pair of projections 120, 122 contacting an inner surface of the slot 100 in the second end 92. In one example, the overwrap layer 86 is bent about a first pair of bends $B_1$ to position the projections 116, 118, 120, 122 relative to the first and second ends 90, 92.

The central body portion 114 further includes a fore flap 124 and an aft flap 126 extending therefrom. When the overwrap layer is bent about a pair of second bends $B_2$, the fore and aft flaps 124, 126 provide fore and aft surfaces of the BOAS segment 74, respectively. It should be understood that the overwrap layer 86 may include a plurality of primary fibers extending in a direction substantially parallel to the first and second pairs of bends $B_1$, $B_2$ to increase the ease of folding the overwrap layer 86.

Figure 5:
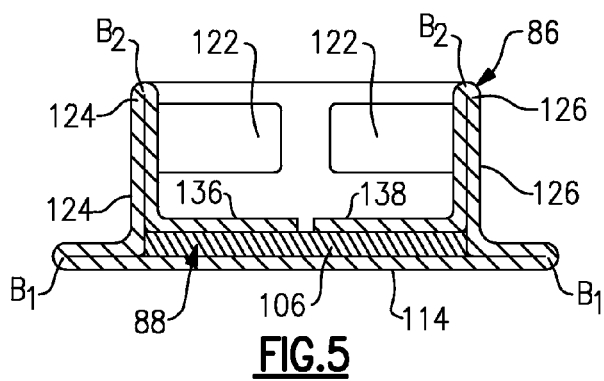
FIG. 5 is a view taken along line 5-5 from FIG. 3.

Projections 128, 130 extend from the fore and aft flaps 124, 126, respectively, to contact a radially outer surface of the bridge 88 adjacent the first end 90. The fore and aft flaps also include another pair of projections 132, 134 which contact a radially outer surface of the bridge 88 adjacent the second end 92. A third, relatively larger pair of projections 136, 138 are provided between the projections 128, 130 and 132, 134. The projections 136, 138 contact a radially outer surface of the substantially planar portion 106 of the bridge 88, as perhaps best seen in FIG. 5, which is a cross sectional view taken along line 5-5 in FIG. 3.

The projections of the overwrap layer 86 urge the base structure 84 against the central body portion 114 of the overwrap layer 86. Further, as generally mentioned above, the bridge 88 urges the first and second ends 90, 92 radially inward against the central body portion 114. In the example where the base structure 84 is made of layered CMC sheets, the overwrap layer 86 provides an effective cap over the edges of the sheets to prevent delamination. Accordingly, the overwrap layer 86 securely holds the base structure 84 intact, against the central body portion 114. By virtue of the discussed arrangement, the overall BOAS segment 74 is relatively strong, lightweight, and temperature resistant.

Figure 7:
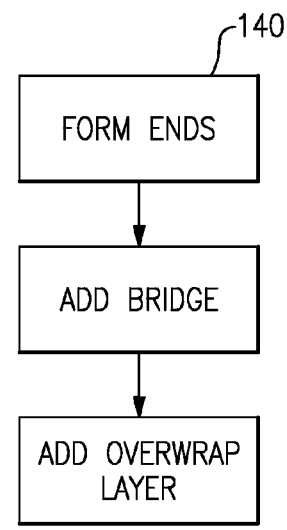
FIG. 7 illustrates an example method for forming the disclosed BOAS segment.

In one example assembly method, schematically represented in FIG. 7, the first and second ends 90, 92 are initially formed separately from one another, and separate from the remainder of the BOAS segment 74, at 140. In this initial step, CMC material is provided in a mold representing the first and second ends 90, 92. The first and second ends 90, 92 are then molded into a semi-rigid state.

Next, at 142, the bridge is formed semi-rigid first and second ends 90, 92 are placed into another mold with additional CMC material to add the bridge 88, and form the base structure 84. In this step, the combination of the first and second ends 90, 92 and the bridge 88 is molded into a semi-rigid state. Alternatively, the bridge 88 is formed separately from the first and second ends 90, 92, molded into a semi-rigid state, and not combined with the first and second ends 90, 92 until the final step 144.

Last, at 144, the overwrap layer 86 is wrapped over the semi-rigid base structure 84, the assembly is placed into yet another mold. This final molding step adheres the overwrap layer 86 directly to the base structure (as illustrated in the figures) and results in the BOAS segment 74 being molded into a solid state. The fillers 110, 112 may be added before the final step 144.

By forming the first and second ends 90, 92 and bridge 88 separately, the individual structures have increased quality. In particular, the individually formed pieces may have a relatively high density, and be substantially free of voids, when compared to examples in which the entire BOAS segment 74 is molded at once.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

What is claimed is:

1. A gas turbine engine, comprising:
   an engine case;
   a retention block attached to the engine case;
   a blade outer air seal (BOAS) including a plurality of layers formed of a ceramic matrix composite (CMC) material, wherein at least one of the plurality of layers provides a slot receiving a portion of the retention block,
   wherein the BOAS includes a base structure and an overwrap layer provided over the base structure, and wherein both the base structure and the overwrap layer are provided by a CMC material,
   wherein the base structure includes first and second ends at opposite circumferential sides of the BOAS, and a bridge extending between the first and second ends, and
   wherein the first and second ends are curved in substantially a C-shape to provide first and second slots.

2. The gas turbine engine as recited in claim 1, wherein each of the first and second slots receive a portion of the retention block attached to the engine case to support the BOAS relative to the engine case.

3. The gas turbine engine as recited in claim 1, wherein both the first end and the second end are provided by a CMC material having primary fibers arranged to substantially follow a contour of a respective one of the slots.

4. The gas turbine engine as recited in claim 1, wherein the bridge is provided by a CMC material having primary fibers extending circumferentially, relative to an engine central longitudinal axis, between the first end and the second end.

5. A gas turbine engine, comprising:
   an engine case;
   a retention block attached to the engine case;
   a blade outer air seal (BOAS) including a plurality of layers formed of a ceramic matrix composite (CMC) material, wherein at least one of the plurality of layers provides a slot receiving a portion of the retention block,
   wherein the BOAS includes a base structure and an overwrap layer provided over the base structure, and wherein both the base structure and the overwrap layer are provided by a CMC material, and
   wherein the overwrap layer includes a central body portion having a plurality of projections extending therefrom, the plurality of projections contacting the base structure.

6. The gas turbine engine as recited in claim 5, wherein the central body portion provides a radially inner surface of the BOAS.

7. The gas turbine engine as recited in claim 5, wherein the overwrap layer includes a fore flap and an aft flap extending from the central body portion, the fore flap and the aft flap providing fore and aft surfaces, respectively, of the BOAS.

8. A blade outer air seal (BOAS), comprising:
   a base structure; and
   an overwrap layer provided over the base structure;
   wherein both the base structure and the overwrap layer are provided by a ceramic matrix composite (CMC) material,
   wherein the base structure includes first and second ends at opposite circumferential sides of the BOAS, and a bridge extending between the first and second ends, and
   wherein the first and second ends are curved in substantially a C-shape to provide first and second slots facing circumferentially away from a center of the BOAS.

9. The BOAS as recited in claim 8, wherein both the first end and the second end are provided by a CMC material having primary fibers arranged to substantially follow a contour of a respective one of the first and second slots.

10. The BOAS as recited in claim 8, wherein the bridge is provided by a CMC material having primary fibers extending circumferentially between the first end and the second end.

11. A method of forming a blade outer air seal (BOAS), comprising:
   forming a base structure of a ceramic matrix composite (CMC) material, wherein the step of forming the base structure includes forming a first end of a CMC material, forming a second end of a CMC material, the second end formed separate from the first end, and forming a bridge of a CMC material; and
   wrapping an overwrap layer of CMC material over the base structure.

12. The method as recited in claim 11, wherein the bridge is formed separately from the first end and the second end.

13. The method as recited in claim 11, wherein the step of forming the base structure includes molding the first end, the second end, and the bridge into a semi-rigid state.

14. The method as recited in claim 11, wherein the step of forming the overwrap layer over the base structure includes molding the first end, the second end, the bridge and the overwrap layer into a solid state.

\* \* \* \* \*